US011206853B2

(12) United States Patent
Blevins (10) Patent No.: US 11,206,853 B2
(45) Date of Patent: Dec. 28, 2021

(54) APPARATUS AND METHOD FOR GENERATING AND MIXING ULTRAFINE GAS BUBBLES INTO A HIGH GAS CONCENTRATION AQUEOUS SOLUTION

(71) Applicant: GAIA USA, INC., Scottsdale, AZ (US)

(72) Inventor: Tim Blevins, Peoria, AZ (US)

(73) Assignee: GAIA USA, INC., Scottsdale, AZ (US)

( * ) Notice: Subject to any disclaimer, the term of this patent is extended or adjusted under 35 U.S.C. 154(b) by 209 days.

(21) Appl. No.: 16/495,081

(22) PCT Filed: Apr. 11, 2018

(86) PCT No.: PCT/US2018/027187
§ 371 (c)(1),
(2) Date: Sep. 17, 2019

(87) PCT Pub. No.: WO2018/191431
PCT Pub. Date: Oct. 18, 2018

(65) Prior Publication Data
US 2020/0045997 A1 Feb. 13, 2020

Related U.S. Application Data

(60) Provisional application No. 62/484,569, filed on Apr. 12, 2017.

(51) Int. Cl.
*B01F 3/04* (2006.01)
*A23L 2/54* (2006.01)
(Continued)

(52) U.S. Cl.
CPC ............ *A23L 2/54* (2013.01); *B01F 3/04503* (2013.01); *B01F 5/0451* (2013.01); *B01F 5/0463* (2013.01);
(Continued)

(58) Field of Classification Search
CPC ...... A23L 2/54; B01F 3/04503; B01F 5/0451; B01F 5/0463; B01F 5/0615; B01F 2003/0439; B01F 2003/04858
(Continued)

(56) References Cited

U.S. PATENT DOCUMENTS

| 2,601,018 A | 6/1952 | Heyl et al. |
| 3,256,802 A * | 6/1966 | Karr .................... B01F 3/04815 99/275 |

(Continued)

FOREIGN PATENT DOCUMENTS

| CN | 87201156 U | 12/1987 |
| GB | 1254179 A | 11/1971 |

(Continued)

OTHER PUBLICATIONS

European Patent Appln. No. 18783887. Extended Search Report (dated Dec. 10, 2020).

(Continued)

*Primary Examiner* — Charles S Bushey
(74) *Attorney, Agent, or Firm* — Loza & Loza, LLP; David S. Sarisky (57) ABSTRACT

An apparatus for generating and mixing gas bubbles into an aqueous solution includes a structure defining an interior fluid-flow chamber extending along a longitudinal axis between a liquid input end and a liquid output end. The structure is characterized by a gas injection portion and a mixing vane portion. The gas injection portion is located downstream from the liquid input end and upstream from the liquid output end. The gas injection portion defines a first region of the interior fluid-flow chamber and a gas injection lumen that is surrounded by the interior fluid-flow chamber. The gas injection lumen, which extends along a length of the gas injection portion, is configured to inject gas from the (Continued)

interior of the gas injection lumen into the surrounding interior fluid-flow chamber. The mixing vane portion extends in the downstream direction from the gas injection portion and define a second region of the interior fluid-flow chamber.

12 Claims, 9 Drawing Sheets

(51) Int. Cl.
  *B01F 5/04* (2006.01)
  *B01F 5/06* (2006.01)
(52) U.S. Cl.
  CPC ..... *B01F 5/0615* (2013.01); *B01F 2003/0439* (2013.01); *B01F 2003/04858* (2013.01)
(58) Field of Classification Search
  USPC .................................. 261/76, 79.2, DIG. 75
  See application file for complete search history.

(56) References Cited

U.S. PATENT DOCUMENTS

| | | | |
|---|---|---|---|
| 3,452,966 A | 7/1969 | Smolski | |
| 3,545,731 A | 12/1970 | Mcmanus | |
| 3,664,638 A * | 5/1972 | Grout et al. | B01F 5/061 366/338 |
| 3,761,066 A * | 9/1973 | Wheeler | B01F 5/0694 261/78.2 |
| 3,852,384 A | 12/1974 | Bearden | |
| 3,953,002 A | 4/1976 | England, Jr. et al. | |
| 4,088,449 A | 5/1978 | Smith | |
| 4,127,332 A | 11/1978 | Thiruvengadam et al. | |
| 4,202,635 A | 5/1980 | Hendrickson | |
| 4,408,893 A | 10/1983 | Rice, III | |
| 4,466,741 A | 8/1984 | Kojima | |
| 4,491,551 A * | 1/1985 | Johnson | B01D 35/06 261/122.1 |
| 4,674,888 A | 6/1987 | Carlson | |
| 4,721,562 A | 1/1988 | Barnscheidt et al. | |
| 4,749,527 A | 6/1988 | Rasmusen | |
| 4,753,535 A * | 6/1988 | King | B01F 5/0451 366/174.1 |
| 4,761,077 A | 8/1988 | Werner | |
| 4,767,026 A | 8/1988 | Keller et al. | |
| 4,840,753 A | 6/1989 | Jungmann et al. | |
| 4,872,833 A | 10/1989 | Kramer | |
| 4,911,836 A | 3/1990 | Haggerty | |
| 5,073,309 A | 12/1991 | Bousquet et al. | |
| 5,091,118 A | 2/1992 | Burgher | |
| 5,498,078 A | 3/1996 | Keller | |
| 5,814,222 A | 9/1998 | Zelenak et al. | |
| 5,842,600 A | 12/1998 | Singleterry et al. | |
| 5,885,467 A | 3/1999 | Zelenak et al. | |
| 5,904,851 A | 5/1999 | Taylor et al. | |
| 5,935,490 A | 8/1999 | Archbold et al. | |
| 6,039,884 A | 3/2000 | Burris et al. | |
| 6,142,457 A | 11/2000 | Holtan et al. | |
| 6,322,055 B1 | 11/2001 | Speece | |
| 6,467,949 B1 | 10/2002 | Reeder et al. | |
| 6,474,627 B2 | 11/2002 | Speece | |
| 6,485,003 B2 | 11/2002 | Speece | |
| 6,623,635 B2 | 9/2003 | Barnes | |
| 6,668,556 B2 | 12/2003 | Speece | |
| 6,848,258 B1 | 2/2005 | Speece | |
| 6,923,568 B2 | 8/2005 | Wilmer et al. | |
| 7,103,450 B2 | 9/2006 | Kubiak et al. | |
| 7,320,749 B2 | 1/2008 | Speece et al. | |
| RE40,407 E | 7/2008 | Natarius | |
| 7,534,351 B2 | 5/2009 | Chiba | |
| 7,566,397 B2 | 7/2009 | Speece | |
| 7,772,376 B2 | 8/2010 | Payne et al. | |
| 7,814,745 B2 | 10/2010 | Levin et al. | |
| 7,905,653 B2 | 3/2011 | Wilmer et al. | |
| 7,975,991 B2 | 7/2011 | Kojima | |
| 8,177,197 B1 | 5/2012 | Ergican | |
| 8,196,906 B2 | 6/2012 | Benton et al. | |
| 8,205,541 B2 | 6/2012 | Barberio et al. | |
| 8,272,777 B2 | 9/2012 | Kohrs et al. | |
| 8,286,951 B2 | 10/2012 | Dart et al. | |
| 8,371,114 B2 | 2/2013 | Hayashi et al. | |
| 8,567,767 B2 * | 10/2013 | Fantappie | B01F 5/0688 261/79.2 |
| 8,580,125 B2 | 11/2013 | Clidence et al. | |
| 10,052,596 B2 | 8/2018 | Richardson | |
| 10,953,375 B2 * | 3/2021 | Blevins | B01F 5/0451 |
| 2001/0003291 A1 * | 6/2001 | Uematsu | B01F 5/0618 137/888 |
| 2001/0033526 A1 | 10/2001 | Illy et al. | |
| 2001/0042708 A1 | 11/2001 | Barnes | |
| 2002/0066970 A1 | 6/2002 | Speece | |
| 2003/0196437 A1 | 10/2003 | Speece | |
| 2004/0112404 A1 | 6/2004 | Doke et al. | |
| 2004/0124136 A1 | 7/2004 | Bak | |
| 2005/0155922 A1 | 7/2005 | Tormaschy et al. | |
| 2005/0173326 A1 | 8/2005 | Speece | |
| 2005/0263914 A1 | 12/2005 | Kojima | |
| 2006/0120214 A1 | 6/2006 | Raftis | |
| 2006/0231500 A1 | 10/2006 | Speece et al. | |
| 2008/0062813 A1 | 3/2008 | Wilmer et al. | |
| 2008/0223782 A1 | 9/2008 | Chiba | |
| 2008/0237140 A1 | 10/2008 | Liverud et al. | |
| 2009/0034361 A1 | 2/2009 | Trang et al. | |
| 2009/0308472 A1 | 12/2009 | Harman | |
| 2010/0011967 A1 | 1/2010 | Barberio et al. | |
| 2010/0025867 A1 | 2/2010 | Benton et al. | |
| 2010/0031825 A1 | 2/2010 | Kemp | |
| 2010/0208547 A1 | 8/2010 | Kiel et al. | |
| 2011/0024362 A1 | 2/2011 | Clidence et al. | |
| 2011/0153084 A1 | 6/2011 | Wilmer et al. | |
| 2012/0032358 A1 * | 2/2012 | Smith | B01F 5/0618 261/76 |
| 2012/0160333 A1 | 6/2012 | West | |
| 2012/0195994 A1 | 8/2012 | El-Siblani et al. | |
| 2013/0215710 A1 | 8/2013 | Hepperle et al. | |
| 2015/0202579 A1 | 7/2015 | Richardson | |
| 2015/0352503 A1 | 12/2015 | Lai | |
| 2016/0136591 A1 * | 5/2016 | Simmons | B01F 5/0465 366/167.1 |
| 2016/0339399 A1 | 11/2016 | Goi | |
| 2016/0346758 A1 | 12/2016 | Kress et al. | |
| 2017/0259219 A1 | 9/2017 | Russell et al. | |
| 2017/0291151 A1 | 10/2017 | Berglund | |
| 2020/0045997 A1 | 2/2020 | Blevins | |
| 2020/0390127 A1 * | 12/2020 | Giardino | B01F 3/04808 |

FOREIGN PATENT DOCUMENTS

| | | |
|---|---|---|
| GB | 2350069 A | 11/2000 |
| GB | 2350069 B | 4/2003 |
| GN | 205032089 U | 2/2016 |
| WO | 199512452 A2 | 5/1995 |
| WO | 2013050764 | 4/2013 |
| WO | 2013050764 A1 | 4/2013 |
| WO | 2018191431 A1 | 10/2018 |

OTHER PUBLICATIONS

CL201902890. Office Action (dated Aug. 10, 2020).
PCT/US2014/070813. Int'l Search Report & Written Opinion (dated Apr. 28, 2015).
PCT/US2018/027187. Int'l Search Report & Written Opinion (dated Aug. 9, 2018).
PCT/US2019/034749. Int'l Search Report & Written Opinion (dated Aug. 15, 2019).
CL201902890. Office Action—Search Report (dated Jan. 6, 2021).

* cited by examiner

APPARATUS AND METHOD FOR GENERATING AND MIXING ULTRAFINE GAS BUBBLES INTO A HIGH GAS CONCENTRATION AQUEOUS SOLUTION

CROSS-REFERENCE TO RELATED APPLICATION

This application is a U.S. national phase application of and claims priority to International Application No. PCT/US2018/027187, entitled "Apparatus and Method for Generating and Mixing Ultra-Fine Gas Bubbles Into a High Gas Concentration Aqueous Solution" and filed on Apr. 11, 2018, which claims the benefit of U.S. Provisional Application Ser. No. 62/484,569, entitled "Apparatus and Method for Generating and Mixing Ultra-Fine Gas Bubbles into a High Gas Concentration Aqueous Solution" and filed on Apr. 12, 2017, the entire disclosures of which are expressly incorporated by reference herein.

TECHNICAL FIELD

Aspects of the present disclosure relates to liquid and gas systems and methods that generate ultra-fine bubbles and mix them into a highly concentrated aqueous solution.

BACKGROUND

Bubbles contained in a liquid are visible to the eyes when the bubble sizes are range from 6 to 29 microns. We can see bubbles in carbonated drinks or those coming from the air diffuser in a water tank. Bubbles with the size of a few millimeters in diameter show visible surfacing action in a liquid, and the presence of fine bubbles of dozens of microns in diameter can be confirmed with white turbidity in a liquid, because these bubbles are scattering substances. Bubbles in diameter smaller than the wavelength of light are called ultra-fine bubbles, and they are too small to see. Ultra-fine bubbles have several unique properties including long lifetime in liquid owing to their negatively charged surface, and high gas solubility into the liquid owing to their high internal pressure. These special features of ultra-fine bubbles have attracted attention from many industries such as food, cosmetics, chemical, medical, semi-conductor, soil and water remediation, aquaculture and agriculture.

SUMMARY

A mixing apparatus for generating and mixing gas bubbles, including for example, ultra-fine bubbles, into an aqueous solution includes a structure defining an interior fluid-flow chamber extending along a longitudinal axis between a liquid input end of the mixing apparatus and a liquid output end of the apparatus. The structure is characterized by a gas injection portion and a mixing vane portion. The gas injection portion, which is located downstream from the liquid input end and upstream from the liquid output end, defines a first region of the interior fluid-flow chamber and a gas injection lumen that is surrounded by the interior fluid-flow chamber. The first region of the interior fluid-flow chamber includes multiple fluid-flow lumens that guide fluid in the downstream direction toward the mixing vane portion. The gas injection lumen, which extends along a length of the gas injection portion, receives gas from a gas supply that is coupled to the gas injection portion and is configured to inject the received gas from the interior of the gas injection lumen into the surrounding interior fluid-flow chamber. The mixing vane portion extends in the downstream direction from the gas injection portion and defines a second region of the interior fluid-flow chamber that is contiguous with the first region of the fluid-flow chamber. The second region of the interior fluid-flow chamber includes multiple fluid-flow lumens, each twisting around the longitudinal axis to form a helical fluid-flow lumen that guides fluid in the downstream direction toward the liquid output end of the mixing apparatus.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details.

Figure 1A:
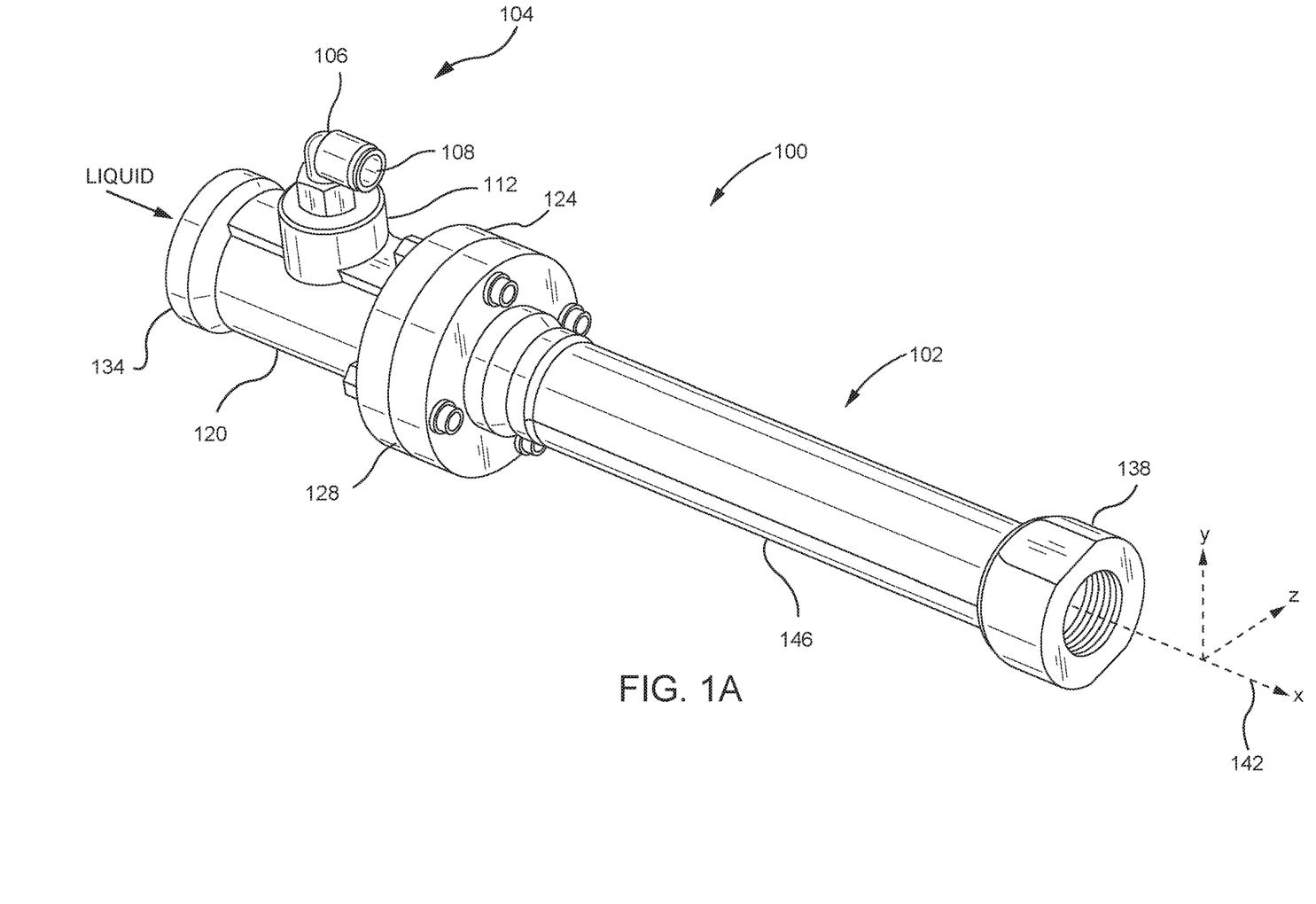
FIG. 1A is perspective illustration of a fully assembled ultra-fine bubble generating liquid/gas mixing apparatus (herein after referred to as a "mixing apparatus") having a gas injection component and a helical mixing vane component forming a structure defining an interior fluid-flow chamber extending along a longitudinal axis between a liquid input end and a liquid output end.
Figure 1B:
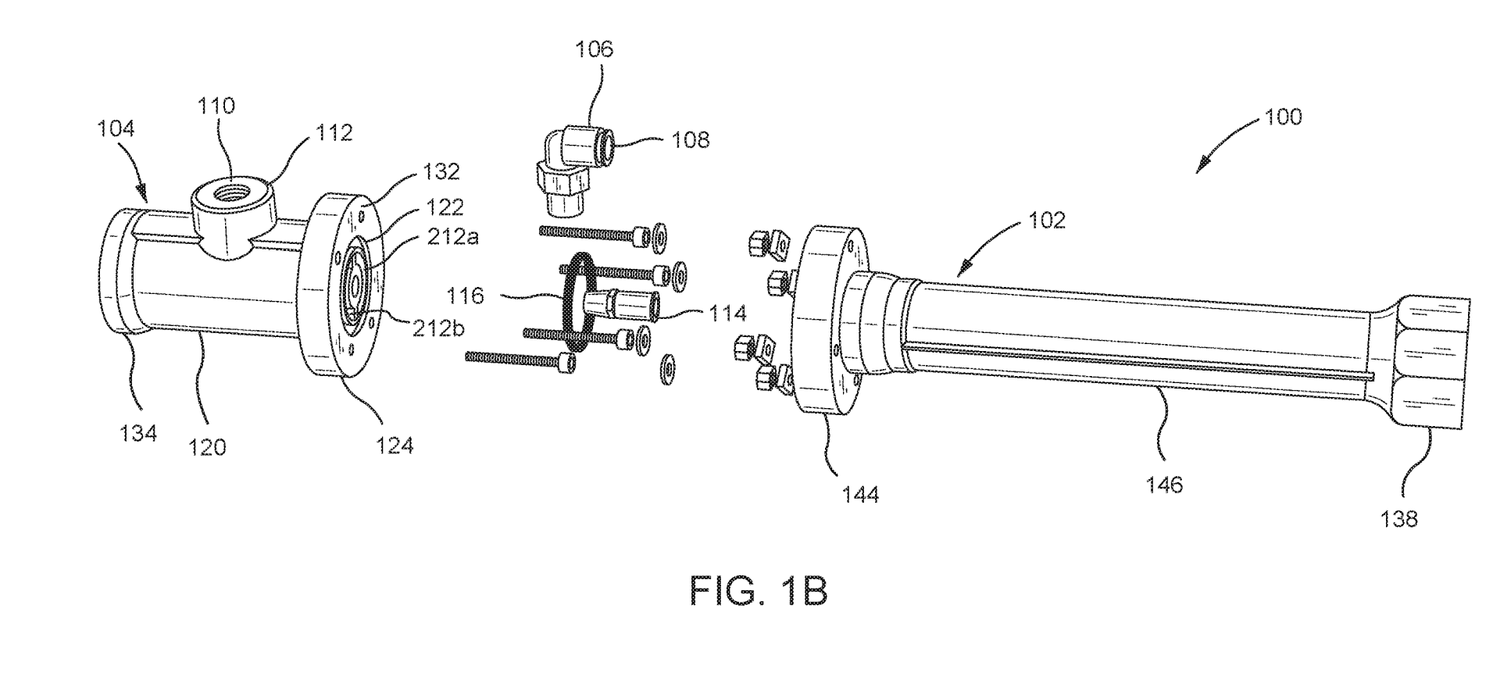
FIGS. 1B and 1C are different perspective illustrations of the mixing apparatus of FIG. 1A disassembled and exploded to show the gas injection component and the helical mixing vane component.
Figure 1C:
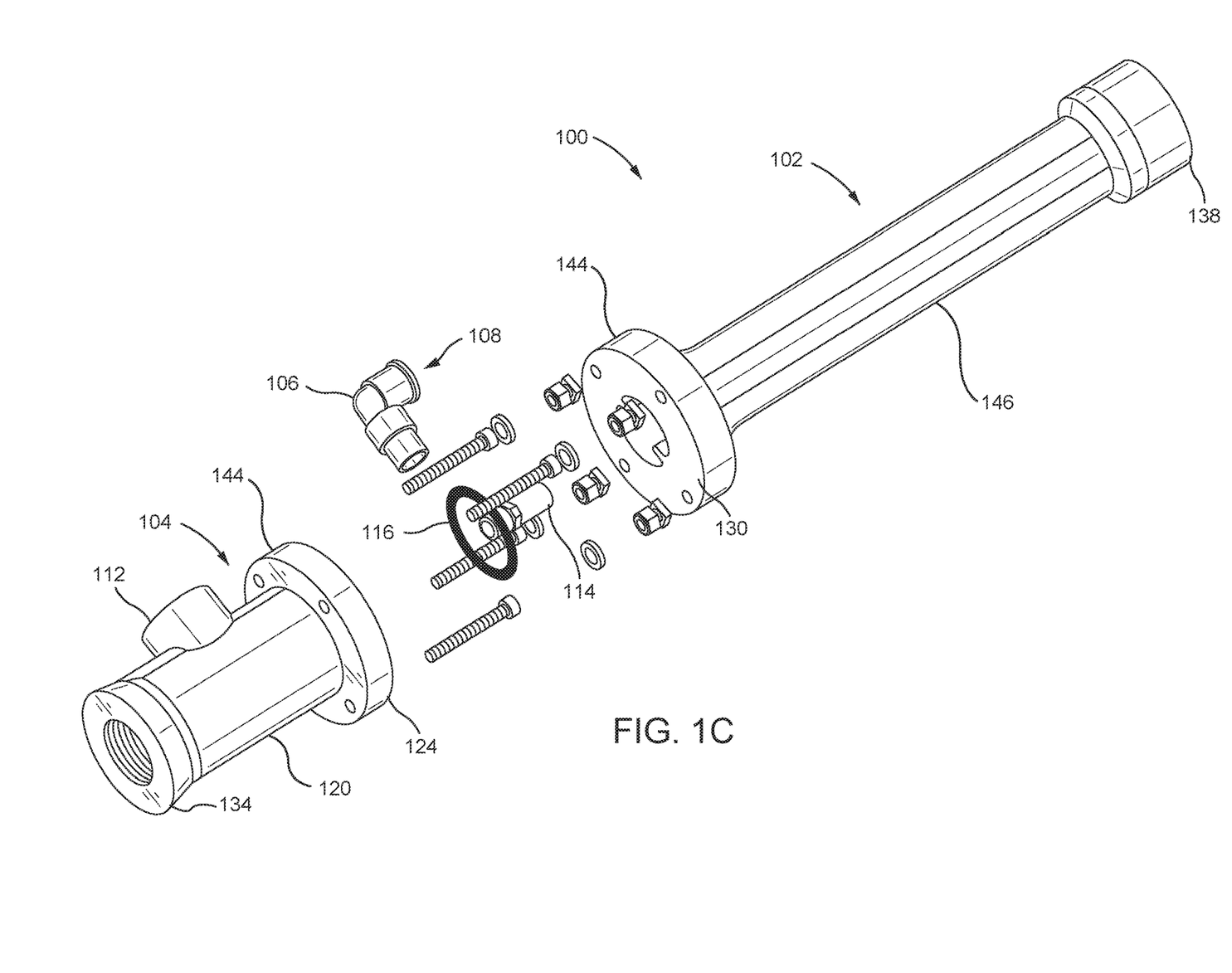
Figure 2:
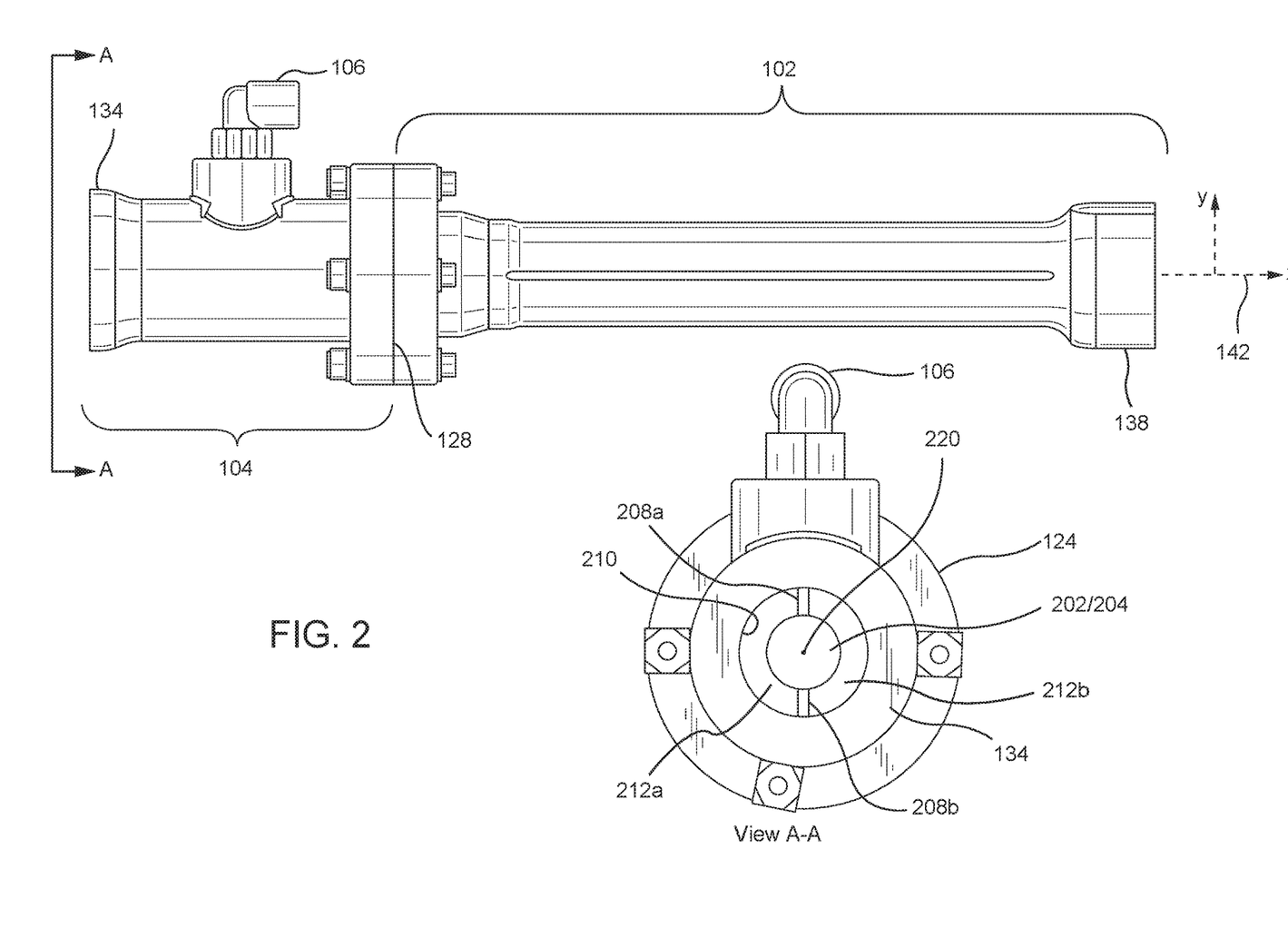
FIG. 2 includes a side view illustration of the mixing apparatus of FIG. 1A, and a scaled-up end-view illustration of the mixing apparatus, where the end view is from the perspective of the liquid input end.

With reference to FIGS. 1A-2, an ultra-fine bubble generating liquid/gas mixing apparatus 100 (herein after referred to as a "mixing apparatus") includes a gas injection component 104 and a mixing vane component 102. In one configuration, the mixing vane component 102 is a variablepitch helical mixing vane. Each of the gas injection component 104 and the mixing vane component 102 defines a respective region of an interior fluid-flow chamber that extends along a longitudinal axis 142 (also referred to herein as the "x axis") between a liquid input end 134 and a liquid output end 138 of the mixing apparatus 100. The interior fluid-flow chamber defines multiple fluid-path lumens that guide fluid through the mixing apparatus. Regarding the longitudinal axis 142, while the example mixing apparatus 100 of FIGS. 1A-2 has a linear longitudinal axis, other embodiments of the mixing apparatus may have non-linear longitudinal axes that curve.

Moving from left to right in FIGS. 1A-2, or in the downstream direction from the liquid input end 134 of the mixing apparatus 100 to the liquid output end 138, the gas injection component 104 includes: a) the liquid input end through which liquid is input to the mixing apparatus, b) a gas input region 120 through which gas is injected into the mixing apparatus, and c) a downstream end 124 where the gas injection component couples to the mixing vane component 102. The gas input region 120 of the gas injection component 104 includes an inlet portion 112 having an opening 110 that is configured to be coupled with a tubular elbow fitting 106. The tubular elbow fitting 106 defines a gas injection port 108 through which gas is injected into a gas injection lumen within the gas injection component 104. The gas input region 120 also defines multiple fluid-path lumens 212a, 212b that form a first region of the interior fluid-flow chamber of the mixing apparatus 100. As shown in FIG. 2, the fluid-path lumens 212a, 212b of the first region of the interior fluid-flow chamber are characterized by a C-shaped cross-section and accordingly are at times referred to herein as C-shaped lumens.

Continuing in the downstream direction, the mixing vane component 102 includes: a) an upstream end 144 where the mixing vane component couples with the gas injection component 104, b) a helical region 146, and c) the liquid output end 138 through which liquid/gas mixture exist the mixing apparatus 100. The helical region 146 defines multiple fluid-flow lumens, each lumen twisting around the longitudinal axis 142 to form a helical fluid-flow lumen that guides fluid in the downstream direction toward the liquid output end 138 of the mixing apparatus 100. The helical fluid-path lumens form a second region of the interior fluid-flow chamber of the mixing apparatus 100. The helical fluid-path lumens of the second region of the fluid-flow chamber are equal in number with the C-shaped fluid path lumens of the first region of the fluid-flow chamber. For example, the mixing apparatus 100 of FIGS. 1A-2 has two C-shaped fluid path lumens, each of which transitions to a corresponding helical fluid-path lumen.

In one configuration, each of the mixing vane component 102 and a gas injection component 104 may be separately manufactured as a single-piece, unitary component using 3D printing. The components 102, 104 may be 3D printed using a plastic or a metallic material. Regarding plastics, the components may be 3D printed, for example, in nylon or a polycarbonate material depending on which material better stands up to the type of gas that will be injected into the mixing apparatus 100. For example, polycarbonate is rated for ozone, while nylon is not. With respect to metallic materials, the components may be 3D printed, for example, in stainless steel.

Once the components 102, 104 are 3D printed, they are assembled with a gas inlet structure 114 and an O-ring 116 and secured together using various fastening components, e.g., nuts, bolts, washers, and a silicon sealant. The gas inlet structure 114 (also referred to herein as a muffler or a diffuser) provides a gas injection interface between gas received through the inlet portion 112 of the gas injection component 104 and the interior fluid-flow chamber of the mixing apparatus 100. The O-ring 116 fits within an annular groove 122 (visible in FIG. 1B) formed in the downstream end 124 of the gas injection component 104. The O-ring 116 provides a seal between liquid/gas mixture flowing through the interior fluid-flow chamber of the mixing apparatus 100 (which chamber passes through the inside of the O-ring) and any gap 128 that may exist between abutting surfaces 130, 132 of the mixing vane component 102 and the gas injection component 104 after assembly of the components.

In an alternative configuration, the mixing apparatus 100 may be 3D printed in its entirety as a single unitary piece by 3D printing, instead of separately 3D printing a mixing vane component 102 and a gas injection component 104 and assembling them. In this case, there is no O-ring 116 and manufacture of the gas inlet structure 114 is integrated with the 3D printing process. For example, as described further below, the gas inlet structure 114 may be formed as an internal structure of a gas injection portion of the mixing apparatus 100.

In other configurations, a mixing apparatus 100 may be manufactured using injection molding techniques. For example, separate molds may be used to form different portions of the mixing apparatus 100 relative to the longitudinal axis 142 of the apparatus. In one implementation, each molded portion corresponds one half of the mixing apparatus 100 along the longitudinal axis 142. Once molded, the two halves may be bonded together to form a single assembly of the mixing apparatus 100.

In any of the foregoing manufacturing configurations, after manufacture or manufacture and assembly, the mixing apparatus 100 may be encased in a sleeve. This may be accomplished by placing the mixing apparatus 100 in a heat-shrink tube; and then heating the tube to shrink into contact with the outer surface of the apparatus to thereby provide an impenetrable sleeve over the entire apparatus.

With reference to FIGS. 2-5, in one configuration the gas injection component 104 includes an outer wall 224 that surrounds a geometric structure 202, e.g., a conical structure, and a hollow structure 204, e.g., a hollow cylinder, that is downstream from the conical structure. The conical structure 202 has a tip 220 that faces the liquid input end 134 of the mixing apparatus 100 and a base 222 opposite the tip. The conical structure 202 functions to constrict the flow of fluid into the gas injection component 104 just enough to maintain a constant back pressure. This reduces the voids in the water stream that may collect large gas bubbles.

The base 222 of the conical structure 202 transitions to the hollow cylinder 204. The interior of the hollow cylinder 204 defines a first portion 206 of the gas injection lumen that extends along the length of the cylinder. Extending from the outer surface of the hollow cylinder 204 are two wing structures 208a, 208b positioned on opposite sides of the cylinder. The wing structures 208a, 208b extend to and merge with an interior surface 210 (visible in FIG. 2, view A-A) of the outer wall 224 of the gas injection component 104.

The space between the outer surfaces of the conical structure 202 and the hollow cylinder 204 and the interior surface 210 of the outer wall 224 of the gas injection component 104 define the first region of the interior fluid-flow chamber. With reference to FIG. 2, view A-A, the wing structures 208a, 208b divide the space between the outer surface of the hollow cylinder 204 and the interior surface 210 of the outer wall 224 to form a pair of separate fluid-path lumens 212a, 212b, which extend along opposite sides of the gas injection component 104. At this first region of the interior fluid-flow chamber, the fluid-path lumens 212a, 212b are generally C-shaped in cross section and extend from the base 222 of the conical structure 202 to the downstream end 124 of the gas injection component 104. In this configuration, the first region of the interior fluid-flow chamber defined by the gas injection component 104 may be characterized as a "bifurcated" first region of the interior fluid-flow chamber. The space between surfaces that define the first region of the interior fluid-flow chamber may also be referred to as a "void", where the void is defined by the absence of any solid material that forms the gas injection component 104.

Figure 6:
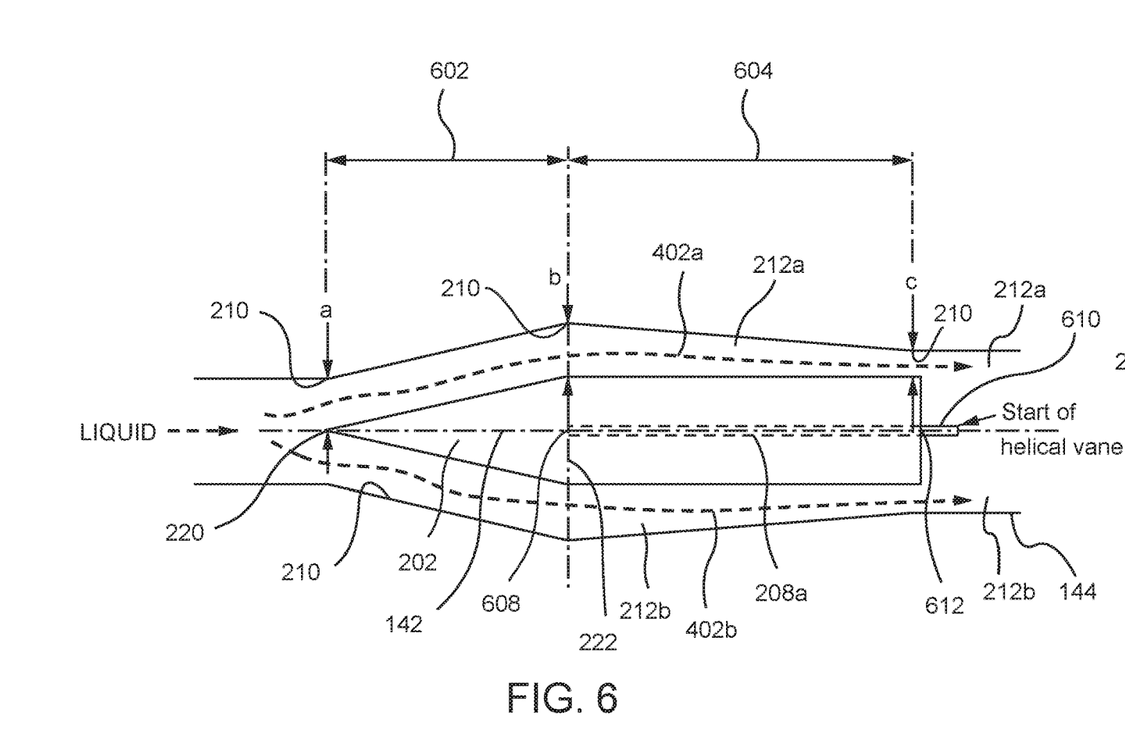
FIG. 6 is a schematic plane representation of the interior fluid-flow chamber of the mixing apparatus of FIG. 1A taken along the x-z plane of FIG. 1A to show bifurcation of the interior fluid-flow chamber into multiple fluid-flow paths.
Figure 7:
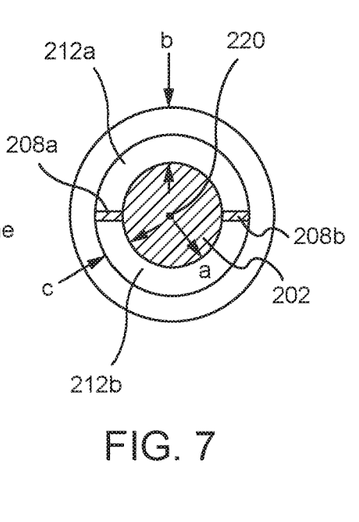
FIG. 7 is a schematic end-view representation of the interior fluid-flow chamber of the mixing apparatus of FIG. 1A from the perspective of the liquid input end and rotated 90 degrees clockwise.

With reference to FIGS. 6 and 7, a first section 602 of the first region of the interior fluid-flow chamber defined by the gas injection component 104 or a gas injection region extends between point "a" and point "b,", and has a first interior radius at point "a" between the tip 220 of the conical structure 202 and the interior surface 210 of the gas injection component at point "a". At the base 222 of the conical structure 202 the interior chamber or void bifurcates into two C-shaped fluid-path lumens 212a, 212b. The width at the beginning of the C-shaped fluid-path lumens 212a, 212b is identified as point "b." This width may be referred to as the radii of the void at point "b," which corresponds to the interior radius of the gas injection component 104 from the center 608 of the gas injection component to the interior surface 210 of the gas injection component at point "b," minus the portion of that radius that is filled with solid material.

A second section 604 of the first region of the interior fluid-flow chamber extends between point "b" and point "c" as shown in FIG. 6. Along the length of the second section 604, the widths of the C-shaped fluid-path lumens 212a, 212b taper down in size relative to the width at point "b." The width at the end of the C-shaped fluid-path lumens 212a, 212b is identified as point "c." This width may be referred to as the radii of the void at point "c," which corresponds to the interior radius of the gas injection component from the center 612 of the component to the interior surface 210 of the gas injection component 104 at point "c," minus the portion of that radius that is filled with solid material. In one example configuration, the radii of the void at point "a" is approximately 0.91", the width (or radii of the void) at point "b" is approximately 0.88", and the width (or radii of the void) at point "c" is approximately 0.82".

Figure 3:
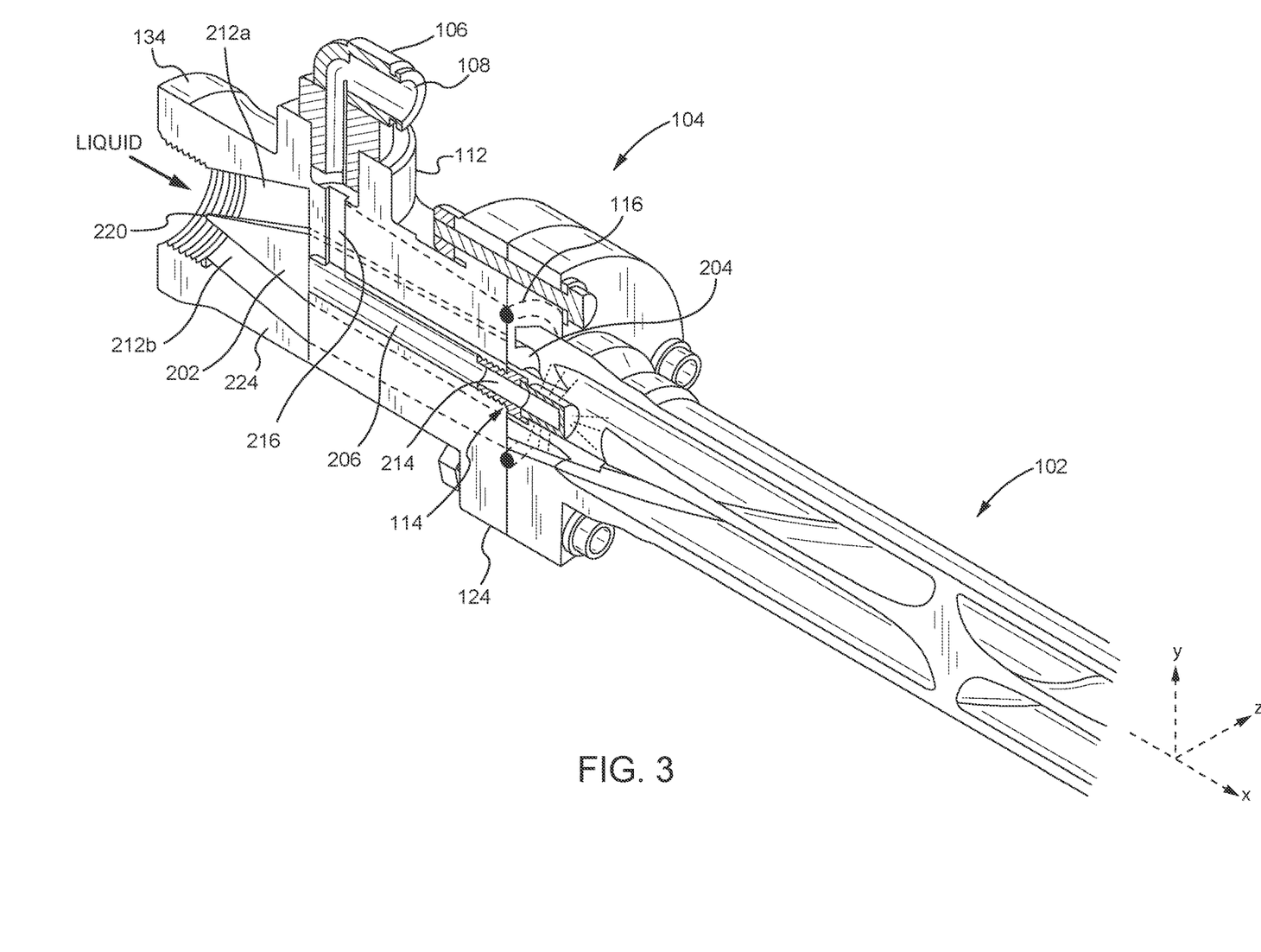
FIG. 3 is a perspective cross-section illustration of the mixing apparatus of FIG. 1A taken along the x-y plane of FIG. 1A, with portions of solid material absent to expose internal structures and components of the mixing apparatus.
Figure 4:
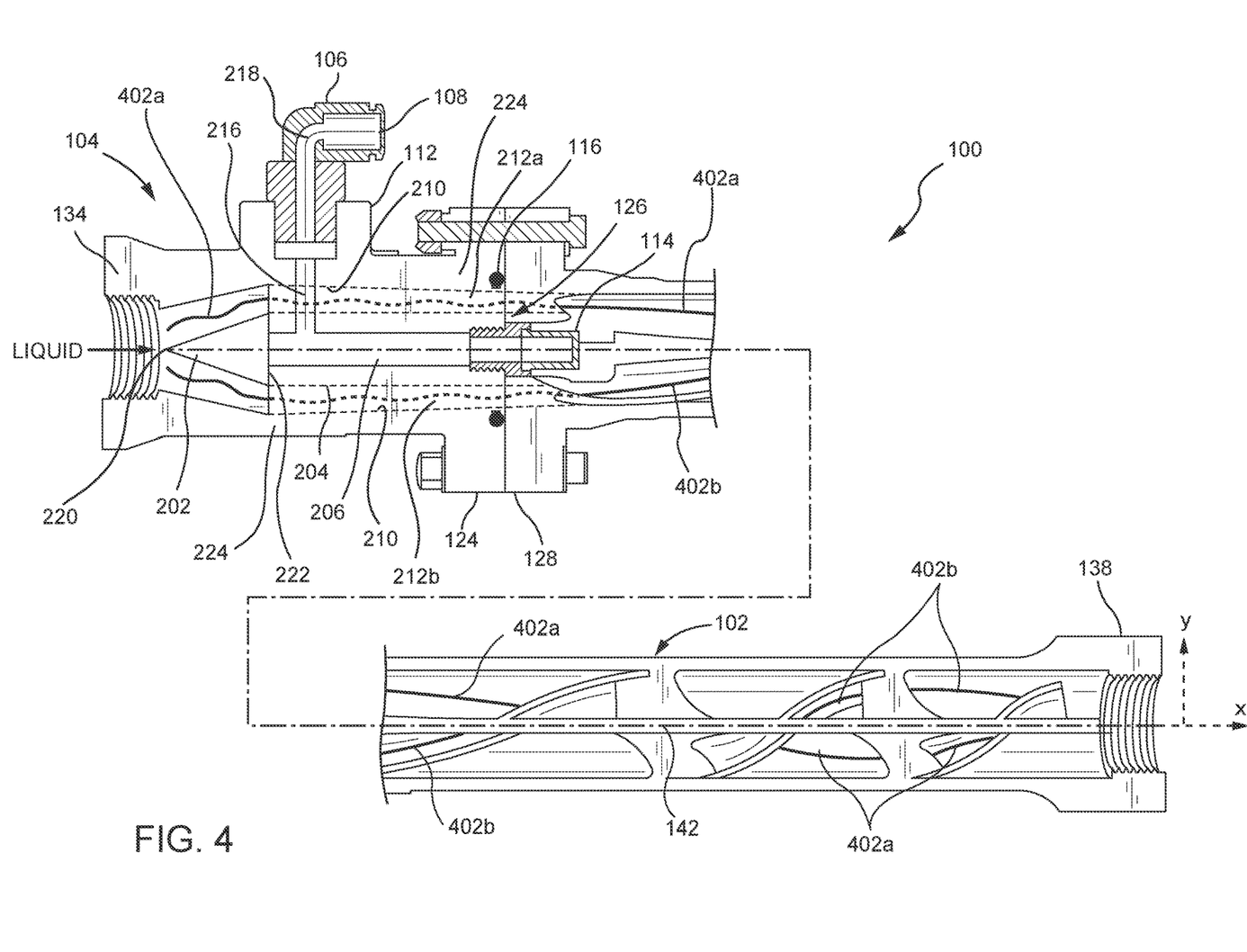
FIG. 4 is a planar cross-section illustration of the fully assembled mixing apparatus of FIG. 2 taken along the x-y plane of FIG. 2.
Figure 5:
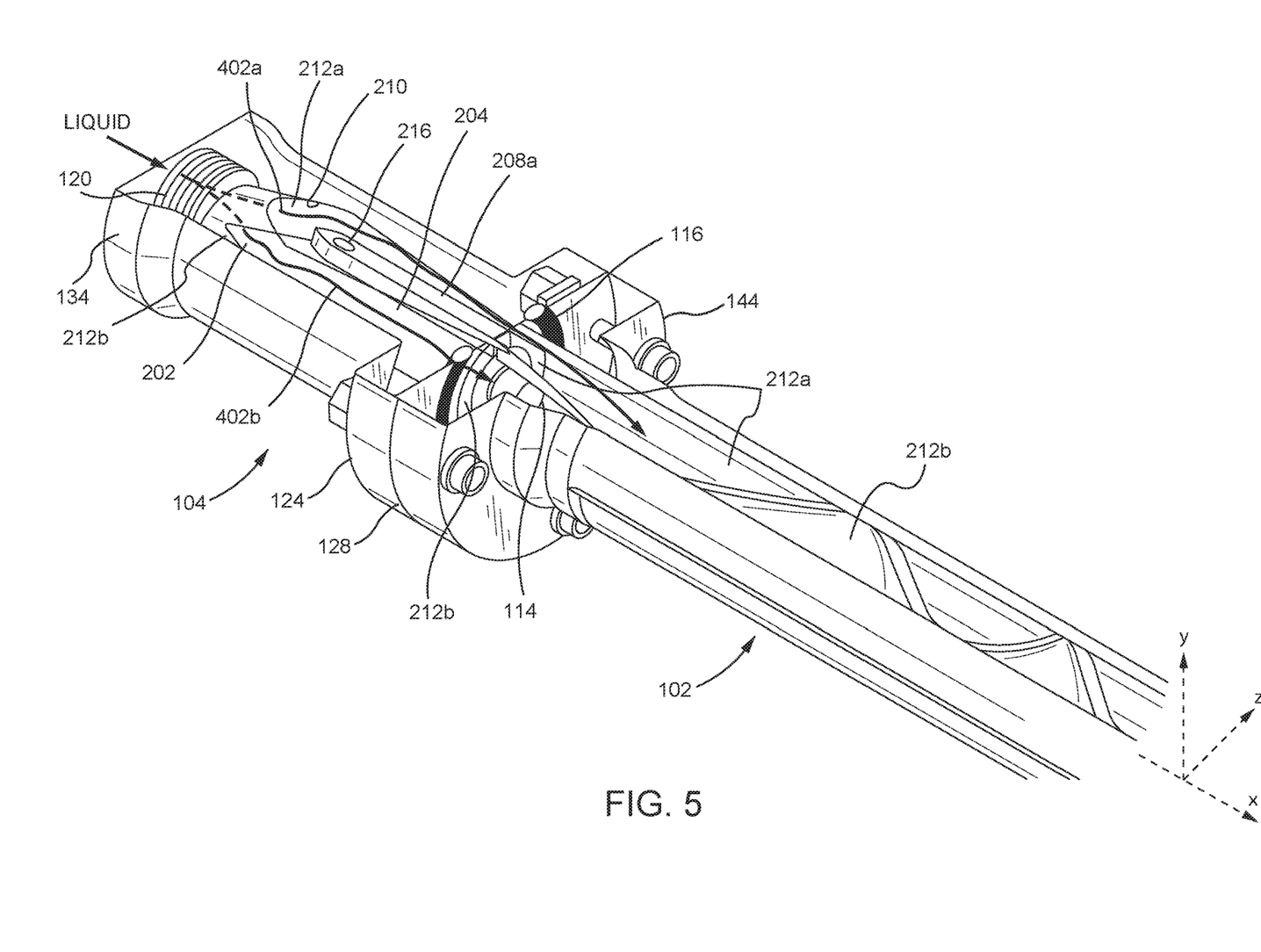
FIG. 5 is a perspective cross-section illustration of the fully assembled mixing apparatus of FIG. 1A taken along a x-z plane that is offset from the origin x-z plane, with portions of solid material absent to expose internal structures and components of the mixing apparatus.

With reference to FIGS. 3-5, as previously mentioned, the interior of the hollow cylinder 204 defines a first portion 206 of a gas injection lumen of the gas injection component 104. This first portion 206 of the gas injection lumen extends along the longitudinal axis 142 of the mixing apparatus 100 from an upstream region of the hollow cylinder 204 that is beneath the inlet portion 112 of the gas injection component 104 to a downstream region of the hollow cylinder 204 at or near the downstream end 124 of the gas injection component. A gas inlet structure 114 extends from the downstream end of the hollow cylinder.

In one configuration, the gas inlet structure 114 comprises a threaded base that screws into the first portion 206 of the gas injection lumen and a cap structure (also referred to as a muffler or a diffuser) that couples with the threaded base. The hollow interior 214 of the gas inlet structure 114 defines a second portion of the gas injection lumen. The cap structure includes a cylindrical sidewall and an end cap, each having a porous structure that permits injected gas to pass through. Alternatively, the gas inlet structure 114 may be configured as a simple Pitot type tube with holes passing through its sidewall and end cap. Configured as such the porous cap or Pitot tube allows for the injection of gas in multiple directions relative to the longitudinal axis 142 of the mixing apparatus 100. For example, with reference to FIG. 3, gas may be injected from the interior of the gas inlet structure 114 into the surrounding interior fluid-flow chamber in a direction radially outward relative to the longitudinal axis 142 and/or downstream, in the direction of the longitudinal axis.

In another configuration, where the mixing apparatus 100 is manufactured as a single unitary structure, a separate gas inlet structure 114 is not present. Instead, the gas inlet structure 114 is formed as part of the downstream region of the hollow cylinder 204. For example, the downstream region of the hollow cylinder 204 may comprise a reduced diameter portion that extends beyond the downstream end 124 of the gas injection component, which portion is formed to include a number of pores through which injected gas may pass in multiple directions relative to the longitudinal axis 142 of the mixing apparatus 100, as described above.

The gas injection lumen of the gas injection component 104 includes a third portion 216 that extends between the base of the inlet portion 112 to the first portion 216 of the gas injection lumen. Extending in this manner, the third portion 216 passes through the outer wall 224 of the gas injection component 104, through a wing structure 208a, and through the wall of the cylinder structure 204 before it merges with the first portion 206 of the gas injection lumen. The first, second and third portions 206, 214, 216 of the gas injection lumen may have any of a number of cross-section shapes. In one configuration, the first portion 206 and second portion 214 are cylindrical, while the third portion 216 is rectangular.

In operation, as shown in FIGS. 5 and 6, a liquid stream input through the liquid input end 134 of the gas injection component 104 is initially displaced and separated by the conical structure 202, with a first portion of the liquid being directed toward and into a first fluid-path lumen 212a to form a first liquid stream 402a, and a second portion of the liquid being directed toward and into a second fluid-path lumen 212b to form a second liquid stream 402b. The conical structure 202 and cylinder structure 204 thus function together to divide or expand a single stream of liquid into multiple liquid streams, e.g., two streams, as it passes through the gas injection component 104, and prior to the liquid reaching the mixing vane component 102. Because of this function, the gas injection component 104 may also be referred to as a "jet stream expander." Expansion of a single liquid stream into multiple liquid streams maximizes the amount of contact between injected gas and the liquid flowing through the gas injection component 104. Expansion into multiple liquid streams also allows the mixing vane component 102 to further compress and shear injected gas into ultra-fine bubbles of sub-micron size.

A method of mixing gas and liquid may include passing liquid through a venturi to create a low-pressure zone, thereby exposing a supply of gas to the low-pressure zone adjacent the venturi. This may allow low pressure suction to extract gas from the gas supply and expose the gas to more liquid before entering the mixing vane component 102. With reference to FIG. 6, the change in diameter and the widths of the C-shaped fluid-path lumens 212a, 212b of the interior fluid-flow chamber along the length of the second section 604 of the gas injection component 104 defines a funnel or venturi. The venturi formed by the interior fluid-flow chamber in the area of the C-shaped fluid-path lumens 212a, 212b provides a gradual reduction in the cross-section area of the fluid-path lumens along the length of the lumens and focuses each of the first liquid stream 402a and the second liquid stream 402b liquid stream along their respective fluid-path lumen 212a, 212b. The reduction in cross-section area of the C-shaped fluid-path lumens 212a, 212b increases the velocity of the liquid passing through the gas injection component 104 and creates a low pressure or suction area adjacent to the end of the C-shaped fluid-path lumens.

With reference to FIG. 5, as the first and second liquid streams 402a, 402b reach the end of their respective C-shaped fluid-path lumens 212a, 212b at the downstream end 124 of the gas injection component 104, each liquid stream transitions into a respective helical fluid-path lumen 212a, 212b in the mixing vane component 102. At this point, the liquid streams 402a, 402b surround the portion of the gas inlet structure 114 that extends into the mixing vane component 102. Gas being injected into the gas injection component 104 through the gas injection port 108 passes through the gas inlet structure 114 and mixes with the surrounding liquid streams 402a, 402b to form an ultra-fine bubble liquid/gas mixture. At this point the streams 402a, 402b are now liquid/gas mixture streams.

As described above, the gas inlet structure 114 through which gas exits may be configured to allow for the injection of gas in multiple directions relative to the longitudinal axis 142 of the mixing apparatus 100, including radially outward relative to the longitudinal axis and downstream, in the direction of the longitudinal axis. Configured in this manner, the mixing apparatus 100 injects gas from a location close to the longitudinal axis 142, into fluid that surrounds the location, as the fluid flows past the location. In other words, the mixing apparatus is configured to inject gas into liquid from the inside out. This is distinct from other mixing apparatuses that are configured to inject gas into liquid from the outside in, for example, through an annular structure surrounding a fluid-flow path, such as disclosed in U.S. Pat. No. 5,935,490.

With reference to FIG. 6, the upstream end 144 of the mixing vane component 102 where each of the fluid streams 402a, 402b transitions from a C-shaped fluid-path lumen to a helical fluid-path lumen, begins as an almost straight blade 610 to reduce back pressure and prevent fluid flow loss. The pitch of the helical fluid-path lumens of the mixing vane component 102 may increase from almost straight to several revolutions per inch over the length of the mixing vane component. The helical fluid-path lumens of the mixing vane component 102 gradually constricts the flow of the liquid/gas mixture and shears and compresses the gas into the liquid. The increased rate of revolutions of the helical fluid-path lumens accelerates the flow of the liquid/gas mixture and further mixes the liquid and gas to create a solution with abundant ultra-fine bubbles.

As the compressed liquid/gas mixture exits through the liquid output end 138 of the mixing apparatus 100, the mixture is expanded slightly. This is done by attaching an exit tube (not shown) to the liquid output end 138. The exit tube may have an internal diameter that is slightly larger than the internal diameter at the liquid output end 138 of the mixing vane component 102. The enlarged internal diameter provided by the exit tube creates a vacuum effect that pulls the liquid/gas mixture forward through the liquid output end 138 and allows the spin of the liquid to stabilize before final discharge from the exit tube. This vacuum effect reduces back pressure on the liquid/gas mixture stream and flow loss associated with back pressure. As the compressed liquid/gas mixture passes through the liquid output end 138, the previously compressed gas bubbles in the liquid/gas mixture expand and explode creating even smaller bubbles of sub-micron size. In one configuration, an exit tube (not shown) is coupled to the mixing vane component 102 at the liquid output end 138. The exit tube is of a length sufficient to allow velocity and rotation of the liquid/gas mixture to slow to normal flow conditions before it discharges into a tank, reservoir or surface body of water. The normal flow condition prevents high speed collisions and forces that will dislodge the trapped ultra-fine gas bubbles.

Figure 8:
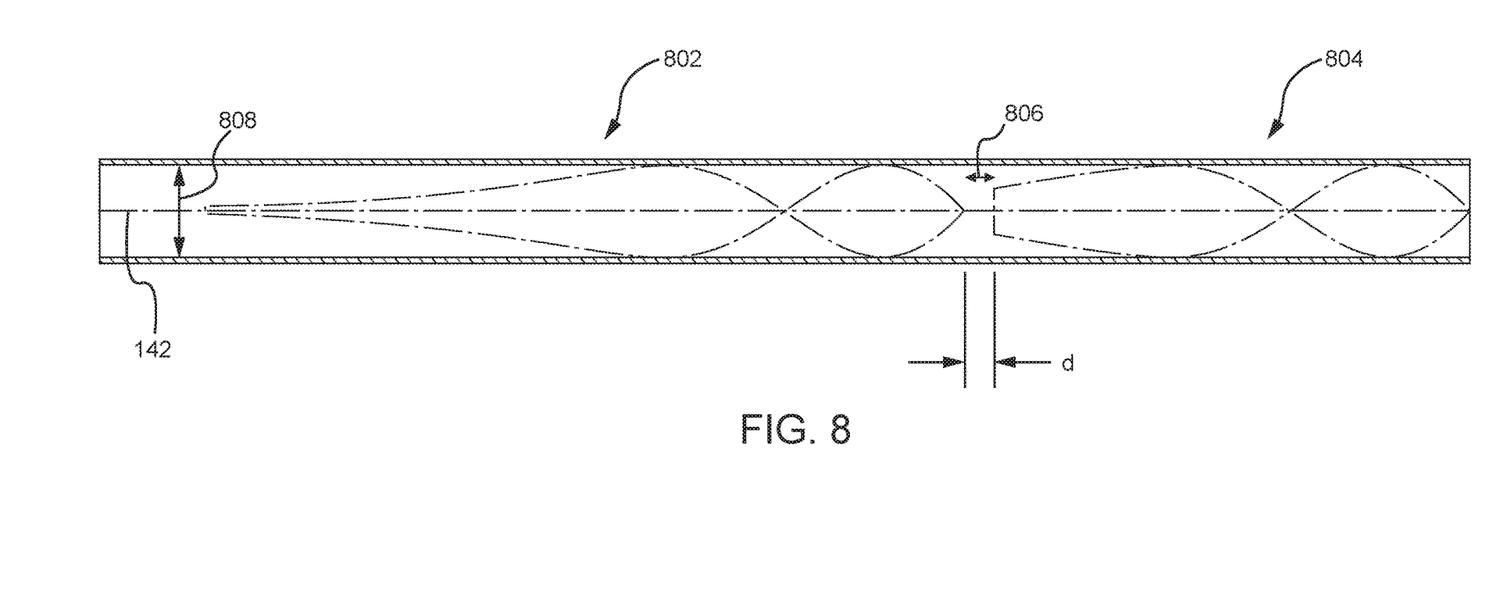
FIG. 8 is a schematic cross-section representation of an alternate configuration of a helical mixing vane component having a series of individual helical vane sections.

In one configuration, the mixing vane component 102 may include a series of individual helical vane sections, of equal or different length, separated by a distance of "d" that is void of any helical structure. FIG. 8 is a schematic representation of a series of individual helical vane sections 802, 804, where a first helical vane section 802 has a length greater than a second helical vane 804. A series of helical vane sections may enable higher gas saturation with more gas injected in real time, while the increased pressure increases the gas transferred to the liquid. The separation distance "d" between adjacent helical vane sections 802, 804 that is void of any helical structure may be anywhere between a small fraction, e.g., one-sixteenth, of the inner diameter 808 of the adjacent mixing vane components 802, 804 to a multiple of the inner diameter. It has been found, however, that a separation distance 806 ranging from between one half of the inner diameter 808 to equal to the inner diameter is more effective in increasing the level of gas saturation.

With reference to FIGS. 1A-8, thus disclosed herein is a mixing apparatus 100 for generating and mixing gas bubbles into an aqueous solution. The mixing apparatus 100 includes a structure defining an interior fluid-flow chamber extending along a longitudinal axis 142 between a liquid input end 134 and a liquid output end 138. The structure is characterized by a gas injection portion and a mixing vane portion. The gas injection portion is located downstream from the liquid input end 134 and upstream from the liquid output end 138. The gas injection portion define a first region of the interior fluid-flow chamber and a gas injection lumen 206, 214, 216. The gas injection lumen 206, 214, 216 is surrounded by the interior fluid-flow chamber and extends along a length of the gas injection portion. The gas injection lumen 206, 214, 216 is configured to inject gas from the interior of the gas injection lumen into the surrounding interior fluid-flow chamber. The mixing vane portion extends in the downstream direction from the gas injection portion and defines a second region of the interior fluid-flow chamber.

The structure may be formed of separately manufactured components that are assembled. For example, the gas injection portion may be in the form of a gas injection component 104 and the mixing vane portion may be in the form of a mixing vane component 102. Alternatively, the structure may be manufactured as a single component, portions of which respectively define a gas injection portion and a mixing vane portion.

The gas injection portion includes an outer wall 224 and a geometric structure 202, e.g., a cone, surrounded by the outer wall. The geometric structure has a tip 220 facing the liquid input end 134 and a base 222 facing the liquid output end 138. The gas injection portion also includes a hollow structure 204, e.g., a cylinder, that is also surrounded by the outer wall 224. The hollow structure 204 extends in the downstream direction from the base 222 of the geometric structure and has a hollow interior that defines a first portion 206 of the gas injection lumen. The outer wall 224 has an interior surface 210 and each of the geometric structure 202 and the hollow structure 204 has an outer surface spaced apart from the interior surface 210. The space between the interior surface 210 and the outer surfaces of the geometric structure 202 and the hollow structure 204 defines the first region of the interior fluid-flow chamber. The space between the interior surface and the outer surfaces changes in dimension along the length of the gas injection portion. The change in dimension creates a venturi that creates a low-pressure zone for liquid that may allow low pressure suction to extract gas from the gas injection lumen 206, 214, 216 and expose the gas to more liquid before entering the mixing vane component 102.

The hollow structure 204 has a gas inlet structure 114 that extends from a downstream region of the hollow structure. The gas inlet structure 114 has a hollow interior that defines a second portion 214 of the gas injection lumen. At least part of the second portion 214 of the gas injection lumen is configured to inject gas into the surrounding interior fluid-flow chamber in at least one of a plurality of directions relative to the longitudinal axis 142. For example, the gas inlet structure 114 may inject gas radially outward relative to the longitudinal axis 142 and/or downstream, in the direction of the longitudinal axis. In one configuration, the gas inlet structure 114 includes a hollow cap structure having at least one of a porous cylindrical sidewall and a porous end cap through which gas may injected into the surrounding interior fluid-flow chamber. In another configuration, the gas inlet structure is a reduced diameter portion of the downstream region of the hollow structure 204 that is formed to include a number of pores through which gas may injected into the surrounding interior fluid-flow chamber.

The first region of the interior fluid-flow chamber defined by the gas injection portion may include a plurality of separate fluid-path lumens 212a, 212b. In one configuration, the plurality of separate fluid-path lumens 212a, 212b are partially defined by a pair of wing structures 208a, 208b that extend between the outer surface of the hollow structure 204 and the interior surface 210 of the outer wall 224. One of the wing structures 208a, 208b may define a third portion 216 of the gas injection lumen. For example, the gas injection portion may include an inlet portion 112 having a base, and the third portion 216 of the gas injection lumen may extend from the base of the inlet portion 112 through one of the pair of wing structures 208a, 208b and into the first portion 206 of the gas injection lumen defined by the hollow structure 204.

The plurality of separate fluid-path lumens 212a, 212b of the first region of the interior fluid-flow chamber are non-helical lumens. For example, the gas injection portion may define a pair of fluid-path lumens 212a, 212b having a C-shaped cross section that extend linearly along part of the gas injection portion. At the junction of the gas injection portion and the mixing vane portion, each of the separate non-helical fluid-path lumens 212a, 212b transition to a helical lumen of the second region of the interior fluid-flow chamber defined by the mixing vane portion. The mixing vane portion may include one helical vane region 802 or a plurality of helical vane regions 802, 804 arranged adjacently along the length of the mixing vane portion. In configurations having multiple helical vane regions, adjacent helical vane regions are separated by void regions 806 that define a tubular lumen.

As previously mentioned, the mixing apparatus 100 thus described may be manufactured using 3D printing technology. In one configuration, each of the mixing vane component 102 and a gas injection component 104 may be separately manufactured as a single-piece, unitary component using 3D printing, and then assemble to form a mixing apparatus 100. In an alternative configuration, the mixing apparatus 100 may be manufactured in its entirety as a single unitary piece by 3D printing.

In either case, it has been shown that a 3D printed mixing vane component 102 results in much higher gas to liquid transfer efficiencies due to the exactness of 3D printing compared to heating and bending plastics (e.g., PVC plastics). The mixing vane component 102 and a gas injection component 104 can be printed using nylon, PVC, and/or other compatible filament with high tensile strength to withstand the force of water flowing at high speeds. The selected 3D print material should also be compatible with the chosen gas to be injected.

Also, as previously described, the mixing apparatus 100 may be manufacturing using techniques other than 3D printing. For example, the mixing apparatus 100 may be manufactured using a number of injection molds to form separate portions of the assembly, which portions are then joined together to form a mixing apparatus 100. The portions may be formed of plastic and bonded together, or metal, e.g., coarse cast iron or aluminum, and welded together.

The liquid/gas mixing apparatus may be manufactured in ½", ¾" and 1½" sizes for use in varying systems, where the size corresponds to the interior diameter of the apparatus at the liquid input end 134 and the liquid output end 138. Larger liquid flows may be accommodated by an array of liquid/gas mixing apparatuses enclosed in a larger pipe. In this configuration, a portion of a large liquid flow is divided into separate portions, each of which passes through a liquid/gas mixing apparatus. Testing of a ½" size ultra-fine bubble generating liquid/gas mixing apparatus configured as disclosed herein, has generated ultra-fine bubbles having a size ~100 nanometers and concentration of 265,000,000 bubbles per ml, as measured using a NanoSight NS300 particle analyzer.

The foregoing description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but instead are to be accorded the full scope consistent with the claim language. All structural and functional equivalents to the elements of the various aspects described throughout this disclosure that are known or later come to be known to those of ordinary skill in the art are expressly incorporated herein by reference and are intended to be encompassed by the claims.

What is claimed is:

1. An apparatus for generating and mixing gas bubbles into an aqueous solution, the apparatus comprising:
a structure defining an interior fluid-flow chamber extending along a longitudinal axis between a liquid input end and a liquid output end, wherein the structure is characterized by:
a gas injection portion located downstream from the liquid input end and upstream from the liquid output end and comprising an outer wall, a geometric structure surrounded by the outer wall and having a tip facing the liquid input end and a base facing the liquid output end, and a hollow structure surrounded by the outer wall and extending in the downstream direction from the base, the gas injection portion defining:
- a first region of the interior fluid-flow chamber, and
- a gas injection lumen surrounded by the interior fluid-flow chamber and extending along a length of the gas injection portion, wherein the gas injection lumen is configured to inject gas from the interior of the gas injection lumen into the surrounding interior fluid-flow chamber, and the gas injection lumen includes a first portion defined by the interior of the hollow structure, and
- a mixing vane portion extending in the downstream direction from the gas injection portion and defining a second region of the interior fluid-flow chamber.

2. The apparatus of claim 1, wherein the outer wall has an interior surface and each of the geometric structure and the hollow structure has an outer surface spaced apart from the interior surface, wherein the space between the interior surface and the outer surfaces defines the first region of the interior fluid-flow chamber.

3. The apparatus of claim 2, wherein the space between the interior surface and the outer surfaces changes in dimension along the length of the gas injection portion.

4. The apparatus of claim 1, wherein the hollow structure comprises an upstream region and a downstream region, and further comprising a gas inlet structure extending from the downstream region, the gas inlet structure having a hollow interior that defines a second portion of the gas injection lumen, wherein at least part of the second portion of the gas injection lumen is configured to inject gas into the surrounding interior fluid-flow chamber in at least one of a plurality of directions relative to the longitudinal axis.

5. The apparatus of claim 4, wherein the plurality of directions comprise: 1) radially outward relative to the longitudinal axis and 2) downstream, in the direction of the longitudinal axis.

6. The apparatus of claim 4, wherein the gas inlet structure comprises a hollow cap structure having at least one of a porous cylindrical sidewall and a porous end cap.

7. The apparatus of claim 4, wherein the gas inlet structure comprises a reduced diameter portion of the downstream region of the hollow structure, which reduced diameter portion is formed to include a number of pores.

8. The apparatus of claim 1, wherein the first region of the interior fluid-flow chamber comprises a plurality of separate fluid-path lumens.

9. The apparatus of claim 8, wherein the plurality of separate fluid-path lumens are partially defined by a pair of wing structures extending between the outer surface of the hollow structure and the interior surface of the outer wall.

10. The apparatus of claim 9, wherein the gas injection portion further comprises:
- an inlet portion having a base; and
- a third portion of the gas injection lumen that extends from the base of the inlet portion through one of the pair of wing structures and into the first portion of the gas injection lumen defined by the hollow structure.

11. The apparatus of claim 1, wherein:
- the first region of the interior fluid-flow chamber comprises a plurality of non-helical lumens; and
- the second region of the interior fluid-flow chamber comprises at least one helical vane region extending along a length of the mixing vane portion, the at least one helical vane region defining a plurality of helical lumens corresponding in number with the number of non-helical lumens.

12. The apparatus of claim 11, wherein the second region of the interior fluid-flow chamber comprises a plurality of helical vane regions arranged adjacently along the length of the mixing vane portion, wherein the plurality of helical vane regions are separated by void regions that define a tubular lumen.

* * * * *